US008151474B2

(12) United States Patent
Kumagai et al.

(10) Patent No.: US 8,151,474 B2
(45) Date of Patent: Apr. 10, 2012

(54) SURVEYING SYSTEM

(75) Inventors: Kaoru Kumagai, Tokyo-to (JP);
Kunihiro Hayashi, Tokyo-to (JP);
Fumihiko Kamizono, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 272 days.

(21) Appl. No.: 12/660,497

(22) Filed: Feb. 26, 2010

(65) Prior Publication Data
US 2010/0229409 A1    Sep. 16, 2010

(30) Foreign Application Priority Data

Mar. 16, 2009   (JP) .................................. 2009-062272

(51) Int. Cl.
*G01C 1/00*    (2006.01)
*G01C 3/08*    (2006.01)
*G01C 15/00*   (2006.01)
(52) U.S. Cl. ........................ 33/290; 33/293; 356/141.1
(58) Field of Classification Search .................... 33/290, 33/1 CC, 263, 264, 276, 277, 281, 291, 293; 356/141.1, 141.4, 141.5
See application file for complete search history.

(56) References Cited

U.S. PATENT DOCUMENTS

| 4,818,107 | A  | * | 4/1989  | Ono et al. ..................... 356/622 |
| 6,286,607 | B1 | * | 9/2001  | Ohtomo et al. ................. 172/4.5 |
| 7,110,102 | B2 |   | 9/2006  | Ohtomo et al. |
| 7,115,852 | B2 | * | 10/2006 | Ohtomo et al. ............. 250/206.2 |
| 7,196,302 | B2 |   | 3/2007  | Ohtomo et al. |
| 7,474,388 | B2 | * | 1/2009  | Ohtomo et al. ............... 356/4.07 |
| 7,564,538 | B2 | * | 7/2009  | Sakimura et al. ............ 356/4.01 |
| 7,633,609 | B2 | * | 12/2009 | Ohtomo et al. ............ 356/141.1 |
| 7,764,365 | B2 | * | 7/2010  | Nichols et al. ............ 356/139.01 |
| 7,966,739 | B2 | * | 6/2011  | Kamizono et al. ............... 33/290 |
| 2004/0125365 | A1 | * | 7/2004  | Ohtomo et al. ............ 356/141.5 |
| 2005/0211882 | A1 | * | 9/2005  | Ohtomo et al. ............... 250/221 |
| 2006/0181454 | A1 |   | 8/2006  | Nichols |

FOREIGN PATENT DOCUMENTS

| EP | 1 211 484 A2    | 6/2002 |
| JP | 2004-212058 A   | 7/2004 |
| JP | 2005-274229 A   | 10/2005 |
| WO | 2008/052590 A1  | 5/2008 |

OTHER PUBLICATIONS

European communication dated Jul. 26, 2010 in corresponding European application (EP10154434.4).

* cited by examiner

*Primary Examiner* — Christopher Fulton
(74) *Attorney, Agent, or Firm* — Nields, Lemack & Frame, LLC

(57) ABSTRACT

The present invention relates to a surveying system, comprising a rotary laser irradiation device 1 installed at a known point and used for projecting two or more fan-shaped laser beams 3 with at least one of the fan-shaped laser beams tilted and for forming a laser reference plane, a photodetection device 4, which is mounted on a mobile support member 9, for receiving the laser beam and for calculating an elevation angle at a photodetecting position, and a monitor photodetection device 11 installed at a known position within the laser reference plane, wherein the monitor photodetection device has a monitor photodetection sensor for sensing and detecting the laser beam, a storage unit for storing a reference value of the laser reference plane, an arithmetic control unit for calculating positional changes over time of the laser reference plane based on the result of photodetection by the monitor photodetection sensor and on the reference value, and a transmitting unit for transmitting the positional changes over time to the photodetection device and/or to the rotary laser irradiation device as compensation information.

12 Claims, 11 Drawing Sheets

SURVEYING SYSTEM

BACKGROUND OF THE INVENTION

The present invention relates to a surveying system for projecting a laser beam in rotary irradiation to form a laser reference plane and for measuring a position based on the laser reference plane.

As a device for forming a reference plane in wide range, a rotary laser irradiation device is known, which projects a laser beam in rotary irradiation. Also, a surveying system is known, in which a photodetection unit is mounted on a working machine such as a bulldozer and other machines and which is used to carry out civil engineering work such as ground leveling operation and other operations according to the detection of the laser reference plane by the photodetection unit.

As one of such types of the rotary laser irradiation devices, a device is known, which projects a plurality of fan-shaped laser beams with at least one of the fan-shaped laser beams tilted at a known angle in rotary irradiation. This type of rotary laser irradiation device can receive and detect the laser beams and can measure an elevation angle and an elevation (high-low) position with the rotary laser irradiation device as a reference based on difference of photodetection time of a plurality of the fan-shaped beams.

When a rotary laser irradiation device is installed and a photodetection unit is mounted on the working machine and civil engineering work is carried out according to the laser reference plane, the working operation generally lasts for a long time, i.e. from the morning till the evening in most cases. Also, there may be extreme temperature change, and the rotary laser irradiation device is subjected to the influence of temperature change. For instance, a rotation shaft of rotary mechanism may be titled due to temperature change, and the projecting direction of the laser beam may change. Or, the posture of the installation of the rotary laser irradiation device may change by vibration or the like. Such change may appear as a positional change over time of the laser reference plane formed by the device, and the laser reference plane, which should be in horizontal direction, may have a tilting component. When the laser reference plane is tilted or the laser reference plane is subject to positional change, error may occur in the civil engineering work, which is carried out by using the laser reference plane as a reference.

It has been practiced in the past that, if the errors over time of the laser reference plane is not allowable, inspection measurement is performed at a certain predetermined time interval during the operation time in one day, and the result of the measurement is compensated or the laser reference plane is re-set each time to maintain the operation accuracy.

When the result of measurement is to be compensated, the procedure is complicated. When the laser reference plane is re-set, an operator must go back to the rotary laser irradiation device and must perform the re-setting procedure, and this makes the operation more complicated and troublesome. Also, the errors caused prior to the moment of re-setting cannot be compensated. Further, the operation must be interrupted during the re-setting procedure, and this causes difficulties and inconveniences, which result in lower working efficiency.

A rotary laser irradiation device for projecting a plurality of fan-shaped laser beams with at least one of the fan-shaped laser beams tilted at a known angle and a surveying system using this type of rotary laser irradiation device are disclosed in JP-A-2004-212058 and JP-A-2005-274229.

SUMMARY OF THE INVENTION

It is an object of the present invention to compensate errors over time of a laser reference plane at real time, and to make information on the laser reference plane to be provided accurately at all times without causing interruption of the working operation.

To attain the above object, the present invention provides a surveying system, comprising a rotary laser irradiation device installed at a known point and used for projecting two or more fan-shaped laser beams with at least one of the fan-shaped laser beams tilted and for forming a laser reference plane, a photodetection device, which is mounted on a mobile support member, for receiving the laser beam and for calculating an elevation angle at a photodetecting position, and a monitor photodetection device installed at a known position within the laser reference plane, wherein the monitor photodetection device has a monitor photodetection sensor for sensing and detecting the laser beam, a storage unit for storing a reference value of the laser reference plane, an arithmetic control unit for calculating positional changes over time of the laser reference plane based on the result of photodetection by the monitor photodetection sensor and on the reference value, and a transmitting unit for transmitting the positional changes over time to the photodetection device and/or to the rotary laser irradiation device as compensation information.

Also, the present invention provides the surveying system as described above, wherein a compensation residual error is obtained based on an installed position of the rotary laser irradiation device, based on an installed position of the monitor photodetection device, based on an expected photodetecting position of the monitor photodetection device when the laser reference plane is set to a reference state and based on a photodetecting position when the laser beam is actually received and the compensation information is produced based on the compensation residual error and the positional changes over time.

Further, the present invention provides the surveying system as described above, wherein a plurality of the monitor photodetection devices are provided at known points, the positional changes over time of the laser reference plane are calculated by each of the monitor photodetection devices, and the compensation information is produced based on a plurality of positional changes over time.

Also, the present invention provides the surveying system as described above, wherein the compensation information is an information of change of the elevation angle, and the elevation angle obtained by the photodetection device is compensated based on the compensation information.

Further, the present invention provides the surveying system as described above, wherein a plurality of the rotary laser irradiation devices are provided at known points, and at least one monitor photodetection device is provided at a known point in a region where the laser reference planes formed by each of rotary laser irradiation devices are overlapped each other.

Also, the present invention provides the surveying system as described above, wherein a plurality of the rotary laser irradiation devices are provided at known points, two monitor photodetection devices are provided at known points in a region where the laser reference planes formed by each of the rotary laser irradiation devices are overlapped each other, a line connecting the two monitor photodetection devices is regarded as a boundary of the two laser reference planes, a predetermined range including the boundary is set up as a smoothing region, and wherein in case there is a deviation in the detecting positions when the two monitor photodetection devices detect two laser reference planes, a smoothing plane connecting the two laser reference planes within the smoothing region is calculated based on a position detected by one of the monitor photodetection devices, and data of the smoothing plane is transmitted to the photodetection device and/or to the rotary laser irradiation device as compensation information.

Further, the present invention provides the surveying system as described above, wherein the smoothing plane obtained, when it is shifted from one of the laser reference planes to the other of the laser reference planes, strides over from a position where one of the laser reference planes goes across the boundary to a position where the other of the laser reference planes goes across the boundary of the smoothing region. Also, the present invention provides the surveying system as described above, wherein the smoothing plane obtained, when it is shifted from one of the laser reference planes to the other of the reference planes, strides over from a position where one of the laser reference planes goes across one of boundaries of the smoothing region to a position where the other of the laser reference planes goes across the other boundary of the smoothing region.

Further, the present invention provides the surveying system as described above, wherein a GPS position measuring device is provided on the photodetection device or on the support member, and coordinate position of the photodetection device is measured. Also, the present invention provides the surveying system as described above, wherein a photodetecting position of the photodetection device is compensated based on a deviation in height direction of the smoothing plane and the laser reference plane within the smoothing region.

Further, the present invention provides the surveying system as described above, wherein the rotary laser irradiation devices project laser beams with different modulations, respectively, and wherein the photodetection device and the monitor photodetection device are designed to discriminate the received laser beams. Also, the present invention provides the surveying system as described above, wherein the monitor photodetection device adds a symbol for discriminating the laser beams to the compensation information to be transmitted, and wherein the photodetection device can discriminate as to which of the rotary laser irradiation devices the compensation information is related based on the symbol.

The present invention provides a surveying system, comprising a rotary laser irradiation device installed at a known point and used for projecting two or more fan-shaped laser beams with at least one of the fan-shaped laser beams tilted and for forming a laser reference plane, a photodetection device, which is mounted on a mobile support member, for receiving the laser beam and for calculating an elevation angle at a photodetecting position, and a monitor photodetection device installed at a known position within the laser reference plane, wherein the monitor photodetection device has a monitor photodetection sensor for sensing and detecting the laser beam, a storage unit for storing a reference value of the laser reference plane, an arithmetic control unit for calculating positional changes over time of the laser reference plane based on the result of photodetection by the monitor photodetection sensor and on the reference value, and a transmitting unit for transmitting the positional changes over time to the photodetection device and/or to the rotary laser irradiation device as compensation information. As a result, errors caused over time can be compensated at real time, and operators do not have to perform the procedure such as compensation of measurement result or the procedure for re-setting the laser reference plane. Accordingly, it is possible to improve working condition and to improve working efficiency because there is no need to interrupt the working operation on the compensation.

Also, the present invention provides the surveying system as described above, wherein a compensation residual error is obtained based on an installed position of the rotary laser irradiation device, based on an installed position of the monitor photodetection device, based on an expected photodetecting position of the monitor photodetection device when the laser reference plane is set to a reference state and based on a photodetecting position when the laser beam is actually received and the compensation information is produced based on the compensation residual error and the positional changes over time. As a result, error of the laser rotary laser irradiation device itself, which cannot be eliminated merely by compensation of the changes over time, can be compensated, and measurement accuracy and working efficiency are improved.

Further, the present invention provides the surveying system as described above, wherein a plurality of the monitor photodetection devices are provided at known points, the positional changes over time of the laser reference plane are calculated by each of the monitor photodetection devices, and the compensation information is produced based on a plurality of positional changes over time. As a result, it is possible to perform compensation of the changes over time in two-dimensional condition of the laser reference plane.

Also, the present invention provides the surveying system as described above, wherein a plurality of the rotary laser irradiation devices are provided at known points, and at least one monitor photodetection device is provided at a known point in a region where the laser reference planes formed by each of rotary laser irradiation devices are overlapped each other. As a result, it is possible to form the reference plane in wider range. Further, by a single monitor photodetection device, the changes over time of a plurality of reference planes can be compensated.

Further, the present invention provides the surveying system as described above, wherein a plurality of the rotary laser irradiation devices are provided at known points, two monitor photodetection devices are provided at known points in a region where the laser reference planes formed by each of the rotary laser irradiation devices are overlapped each other, a line connecting the two monitor photodetection devices is regarded as a boundary of the two laser reference planes, a predetermined range including the boundary is set up as a smoothing region, and wherein in case there is a deviation in the detecting positions when the two monitor photodetection devices detect two laser reference planes, a smoothing plane connecting the two laser reference planes within the smoothing region is calculated based on a position detected by one of the monitor photodetection devices, and data of the smoothing plane is transmitted to the photodetection device and/or to the rotary laser irradiation device as compensation information. As a result, when operation is carried out by forming a plurality of laser reference planes by using a plurality of rotary laser irradiation devices, in case where a graded step may be caused at the boundary of the plurality of laser reference planes, the graded step can be eliminated, accordingly, the operation can be carried out smoothly.

Also, the present invention provides the surveying system as described above, wherein the rotary laser irradiation devices project laser beams with different modulations, respectively, and wherein the photodetection device and the monitor photodetection device are designed to discriminate the received laser beams. Thus, by using a plurality of rotary laser irradiation devices, the reference planes can be formed in wider range.

Further, the present invention provides the surveying system as described above, wherein the monitor photodetection device adds a symbol for discriminating the laser beams to the compensation information to be transmitted, and wherein the photodetection device can discriminate as to which of the rotary laser irradiation devices the compensation information is related based on the symbol. Thus, a plurality of compensation information can be discriminated from each other and can be recognized.

DETAILED DESCRIPTION OF THE PREFERRED EMBODIMENTS

Figure 1:
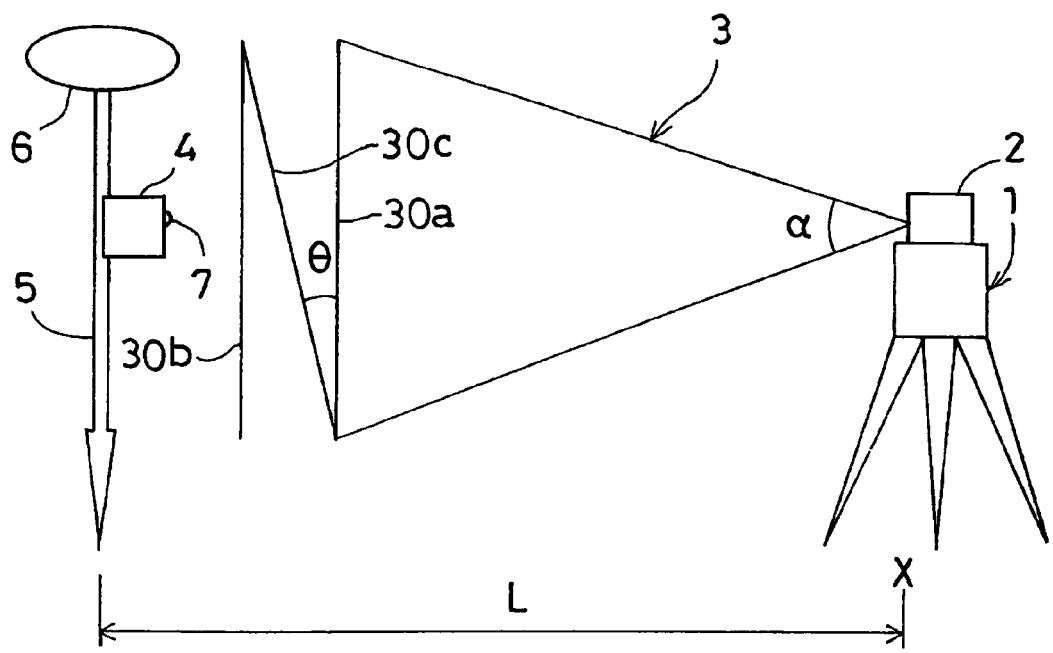
FIG. 1 is a schematical illustrative drawing to show an embodiment of the present invention.

Description will be given below on embodiments of the present invention by referring to the attached drawings.

A rotary laser irradiation device used in the present embodiments is designed to project a plurality of fan-shaped laser beams with at least one of the fan-shaped laser beams tilted at a known angle in rotary irradiation at predetermined speed, and a photodetection device for receiving and detecting the fans-shaped beams is provided with a GPS device.

First, referring to FIG. 1 to FIG. 4, description will be given on general features of the rotary laser irradiation device and a photodetection device for projecting the fan-shaped beams in rotary irradiation.

A rotary laser irradiation device 1 is installed at a known point X. The rotary laser irradiation device 1 has a rotating unit 2. A laser beam 3 is projected from the rotating unit 2 in horizontal direction. Further, the laser beam is rotated, and a horizontal laser reference plane is formed.

The laser beam 3 comprises a plurality of fan-shaped beams, e.g. three fan-shaped beams 30a, 30b and 30c. The fan-shaped beams 30a, 30b and 30c are spread with a spreading angle α to spread in up and down direction. The fan-shaped beams 30a and 30b are spread in vertical direction (the fan-shaped beams 30a and the fan-shaped beam 30b are in parallel to each other), and the fan-shaped beam 30c is tilted at a known angle θ with respect to the vertical direction. Therefore, a cross-section of luminous flux of the laser beam 3 is N-shaped as shown in the figure.

The photodetection unit 4 is supported by a support member as necessary, and for example, the photodetection unit 4 is supported by a rod 5 in the figure. A GPS position measuring device 6 is installed on the rod 5.

The photodetection device 4 is provided with a spot-like photodetection sensor 7. The photodetection sensor 7 detects each of the fan-shaped beams 30a, 30b and 30c, which passes the photodetection sensor 7 and produces a photodetection signal. Here, a distance from the photodetection sensor 7 to a lower end of the rod 5 and a distance from the GPS position measuring device 6 to the lower end of the rod 5 are already known.

Figure 2:
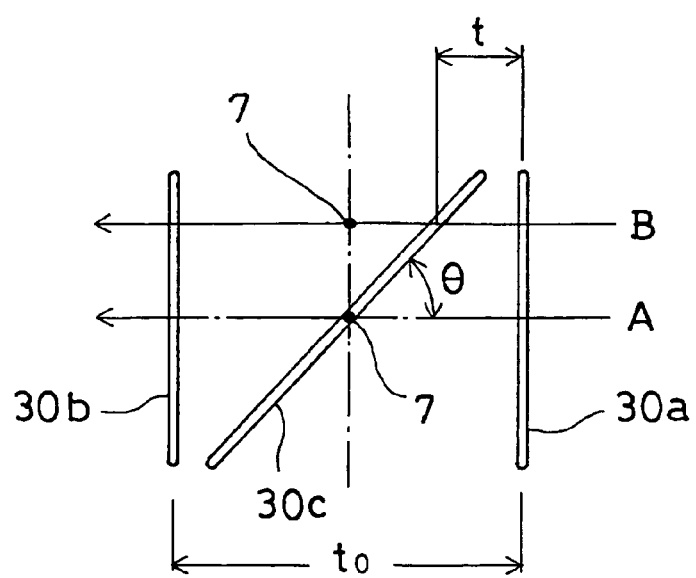
FIG. 2 is an illustrative drawing to show a relation between fan-shaped beams and a photodetection sensor.
Figure 3:
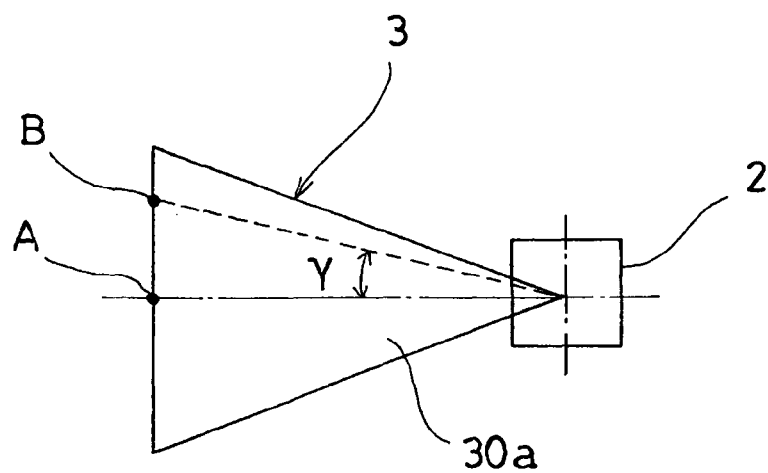
FIG. 3 is an illustrative drawing to show a relation between the fan-shaped beams and a photodetection sensor.
Figure 4:
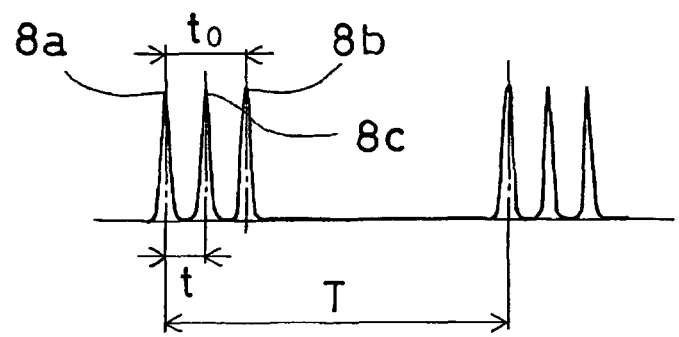
FIG. 4(A) and FIG. 4(B) each represents an illustrative diagram to show a photodetection signal of the photodetection sensor.
Figure 4:
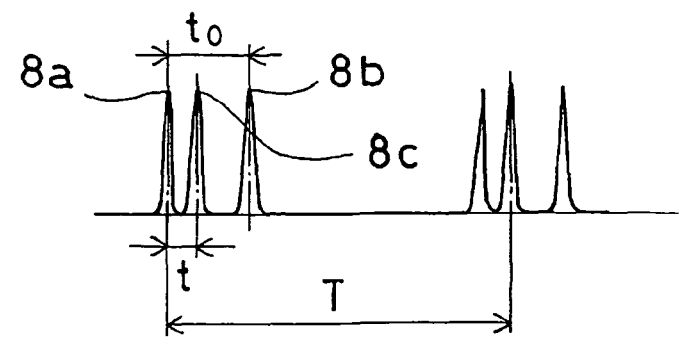

FIG. 2 and FIG. 3 each shows a positional relation between the photodetection sensor 7 and each of the fan-shaped beams 30a, 30b and 30c when the laser beams 3 are projected in rotary irradiation. FIG. 4(A) and FIG. 4(B) each represents a diagram to show photodetection signals 8a, 8b and 8c when the fan-shaped beams 30a, 30b and 30c are received and detected. The laser beams 3 are projected in rotary irradiation so that the center (of the beams) in vertical direction is at horizontal position.

When the laser beams 3 are projected for scanning so that the photodetection sensor 7 passes a point A in FIG. 2 and FIG. 3, a horizontal position of the laser beams 3, i.e. time interval of the photodetection signals 8a, 8b and 8c produced by the photodetection sensor 7 is to be an equal time interval (t=t0/2) (see FIG. 4(A)). When the laser beams 3 are projected for scanning so that the photodetection sensor 7 passes a point B in FIG. 2 and FIG. 3, time interval (t<t0/2) of the photodetection signals 8a, 8b and 8c produced by the photodetection sensor 7 is different in each case (see FIG. 4(B)). From the value of t/t0, a passing position B on a cross-section of luminous fluxes can be determined, and an elevation angle γ with a projection center of the laser beams 3 (i.e. rotation center of the rotating unit 2 in the figure) as the center. From the result of position measurement by the GPS position measuring device 6 and from the position where the rotary laser irradiation device 1 is installed, a distance L between the rotary laser irradiation device 1 and the photodetection sensor 7 can be determined, and an elevation position (a vertical position) of the photodetection sensor 7 can be calculated from the distance L and the elevation angle γ.

Figure 5:
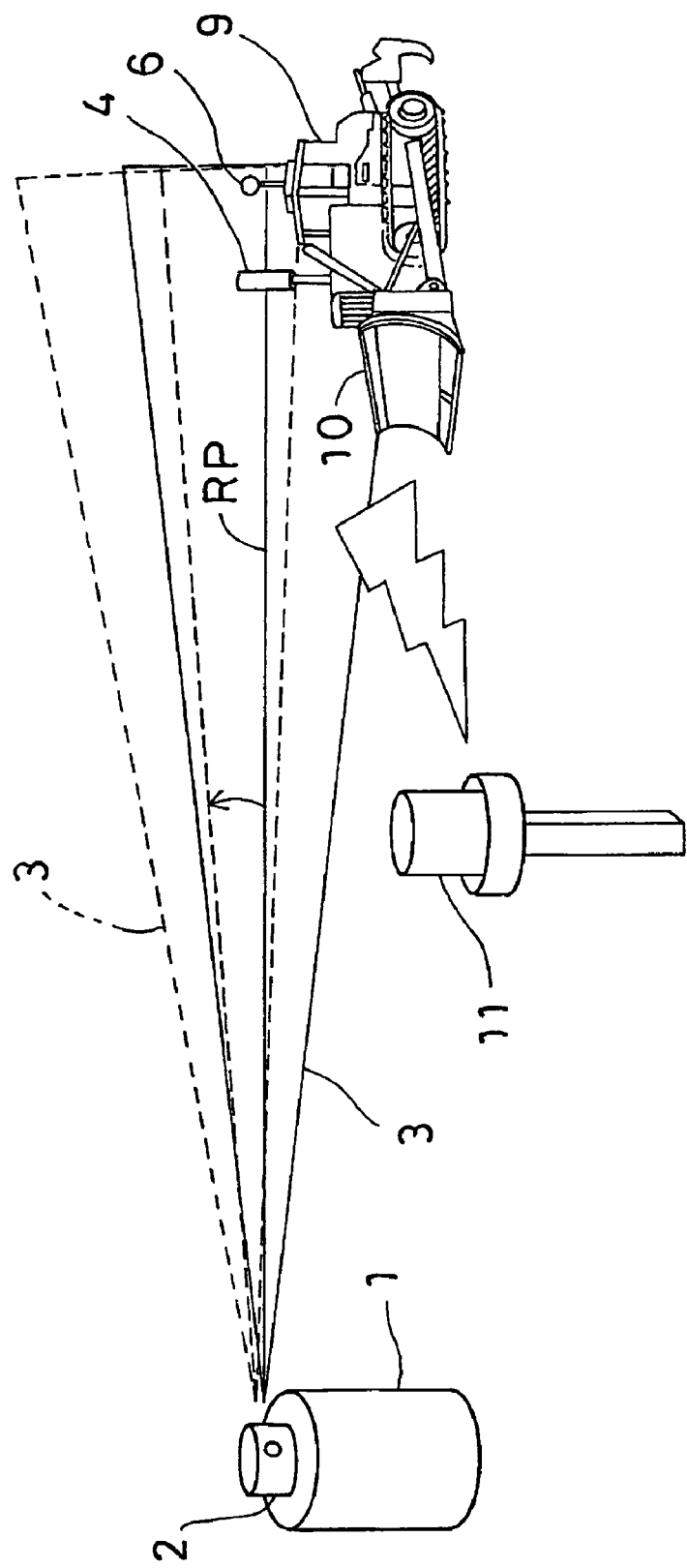
FIG. 5 is a schematical illustrative drawing of a first embodiment of the present invention.

Next, referring to FIG. 5 and FIG. 6, description will be given on a first embodiment of the present invention.

The rotary laser irradiation device 1 and the photodetection device 4 used in the first embodiment are the same as described in FIG. 1, and the photodetection device 4 is mounted on a working machine 9 (a bulldozer in the figure) as a supporting unit. On the working machine 9, a GPS position measuring device 6 is mounted so that a position of the working machine 9 can be measured.

In the first embodiment, a monitor photodetection device 11 is installed at a known point within the range where the laser beams 3 are projected in rotary irradiation.

Similarly to the photodetection device 4, the monitor photodetection device 11 has a spot-like photodetection sensor (not shown). The photodetection sensor detects each of the fan-shaped beams 30a, 30b and 30c (see FIG. 1), which pass through the photodetection sensor, and the photodetection sensor produces the photodetection signals.

Now, referring to FIG. 6, description will be given on general features of the photodetection device 4 and the monitor photodetection device 11.

First, description will be given on the photodetection device 4 mounted on the working machine 9.

The photodetection device 4 primarily comprises a photodetection sensor 7, a mobile station arithmetic control unit 12, a mobile station wireless communication unit 13, and a mobile station storage unit 16. The mobile station arithmetic control unit 12 further comprises a mobile station elevation angle calculating unit 14 and a mobile station compensation information processing unit 15. The photodetection device 4 is electrically connected to a control device 29, which controls a height of a blade 10 and other values of the working machine 9.

The mobile station arithmetic control unit 12 calculates an elevation angle with respect to the rotary laser irradiation device 1 based on a signal from the photodetection sensor 7, and calculates a height position (position in height) of the photodetection sensor 7. The result of calculation is transmitted to the control device 29 of the working machine 9. Based on the result of calculation, the control device 29 controls the height of the blade 10.

The mobile station compensation information processing unit 15 acquires compensation information from the monitor photodetection device 11 (to be described later) via the mobile station wireless communication unit 13 and calculates compensation data, which is required when the mobile station arithmetic control unit 12 calculates the elevation angle.

The monitor photodetection device 11 primarily comprises a monitor photodetection sensor 17, a monitor arithmetic control unit 18, a monitor wireless communication unit 19, and a monitor storage unit 23. The monitor arithmetic control unit 18 further comprises a monitor elevation angle calculating unit 21 and a monitor compensation information producing unit 22.

In the monitor storage unit 23, various programs are stored, i.e. a calculation program for calculating the elevation angle or for producing the compensation information, a compensation residual error calculating program for calculating a compensation residual error (to be described later), and other programs. Based on a signal from the monitor photodetection sensor 17, the monitor arithmetic control unit 18 calculates the elevation angle, and the result of calculation is stored in the monitor storage unit 23. An initial value of an elevation angle when the laser reference plane is set, or an elevation angle detected during operation, a compensation information acquired by calculation, etc. are stored.

By the monitor compensation information producing unit 22, an elevation angle at the initial setting when the laser reference plane is set up is compared with an elevation angle obtained at real time, and the deviation is calculated. The deviation thus obtained is transmitted to the mobile station wireless communication unit 13 as compensation information via the monitor wireless communication unit 19.

Description will be given below on operation of the first embodiment.

First, as the initial setting, the rotary laser irradiation device 1 is installed at a known point. By a leveling device (not shown) provided on the rotary laser irradiation device 1, leveling is performed on the rotary laser irradiation device 1, and projecting direction (vertical direction) from the laser beam 3 is adjusted so that the laser beam 3 (the center of luminous fluxes of the laser beam 3) projected from the rotary laser irradiation device 1 in rotary irradiation forms a horizontal laser reference plane RP.

Under a condition that the laser beam 3 forms the horizontal laser reference plane RP, the laser beam 3 is detected by the monitor photodetection device 11.

Based on the result of detection of the laser beam 3 by the monitor photodetection device 11, an elevation angle at the monitor photodetection device 11 is calculated. Under the condition that the laser beam 3 forms the horizontal reference plane, it is preferable that the monitor photodetection sensor 17 of the monitor photodetection device 11 detects the center of the laser beam 3.

An elevation angle $\gamma 0$ in horizontally setup state is stored in the monitor storage unit 23 as an initial setting elevation angle. Because the monitor photodetection device 11 is fixedly installed, when the elevation angle $\gamma m$ detected by the monitor photodetection device 11 is changed, it means that positional change (displacement in vertical direction) over time has occurred to the laser reference plane RP formed by the rotary laser irradiation device 1.

The monitor compensation information producing unit 22 obtains a deviation $\sigma$ of an elevation angle $\gamma m$ detected at real time from the stored elevation angle $\gamma 0$. The deviation $\sigma$ thus obtained is transmitted to the mobile station wireless communication unit 13 via the monitor wireless communication unit 19.

Figure 7:
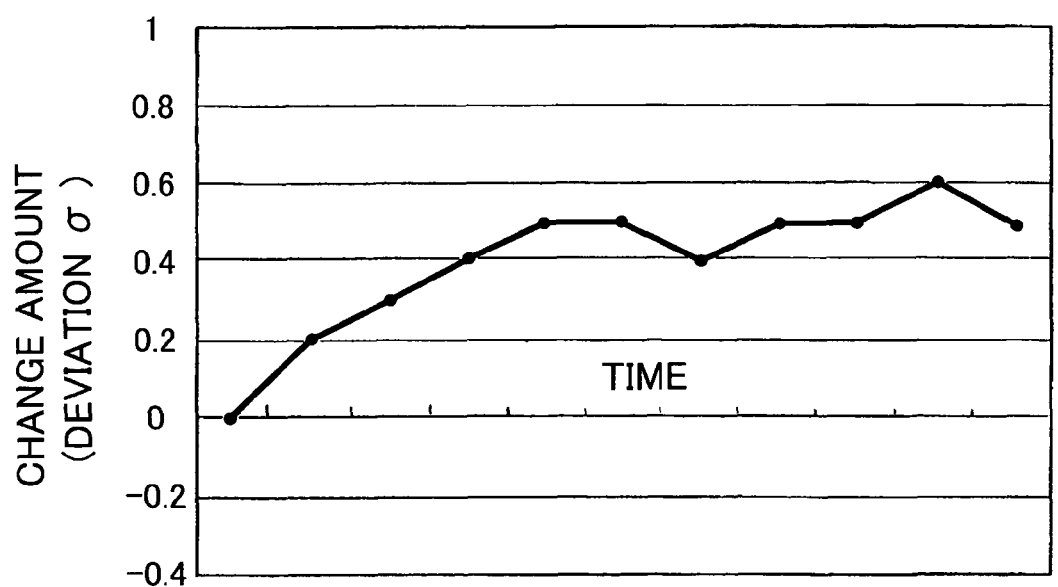
FIG. 7 is a diagram to show changes over time of a laser reference plane.

FIG. 7 shows the changes over time of the deviation $\sigma$ detected by the monitor photodetection device 11.

The photodetection device 4 mounted on the working machine 9 calculates an elevation angle $\gamma d$ based on the result of photodetection obtained by the photodetection sensor 7. A coordinate position of the working machine 9, i.e. a coordinate position of the photodetection device 4, is measured by the GPS position measuring device 6. From the installed position (a known point) of the rotary laser irradiation device 1, a distance L between the rotary laser irradiation device 1 and the working machine 9 (i.e. the photodetection device 4) is measured, and a height position of the photodetection device 4 can be calculated from the distance L and the elevation angle $\gamma d$. Based on the calculated height position, a height of the ground surface to be leveled can be calculated, and the result is reflected in the ground leveling operation of the working machine 9.

The ground leveling operation is carried out by using the laser reference plane RP formed by the laser beam 3 as a reference. If there is a positional change over time on the laser reference plane RP, the elevation angle $\gamma d$ thus obtained contains error, and an error occurs on the level ground surface.

Based on the deviation $\sigma$ received by the mobile station wireless communication unit 13, the mobile station compensation information processing unit 15 compensates the elevation angle $\gamma d$. The mobile station arithmetic control unit 12 transmits the compensated elevation angle $\gamma d$ to the control device 29, or the height data calculated based on the compensated elevation angle is transmitted to the control device 29. Then, the control device 29 controls a height of the blade 10 based on the elevation angle $\gamma d$ or on the height data.

The monitor photodetection device 11 detects the deviation $\sigma$ at real time and transmits the deviation $\sigma$ to the mobile station wireless communication unit 13 via the monitor wireless communication unit 19. Thus, the elevation angle $\gamma d$ detected by the photodetection device 4 is compensated at real time, and ground leveling operation by the working machine 9 is carried out with high accuracy.

Figure 8:
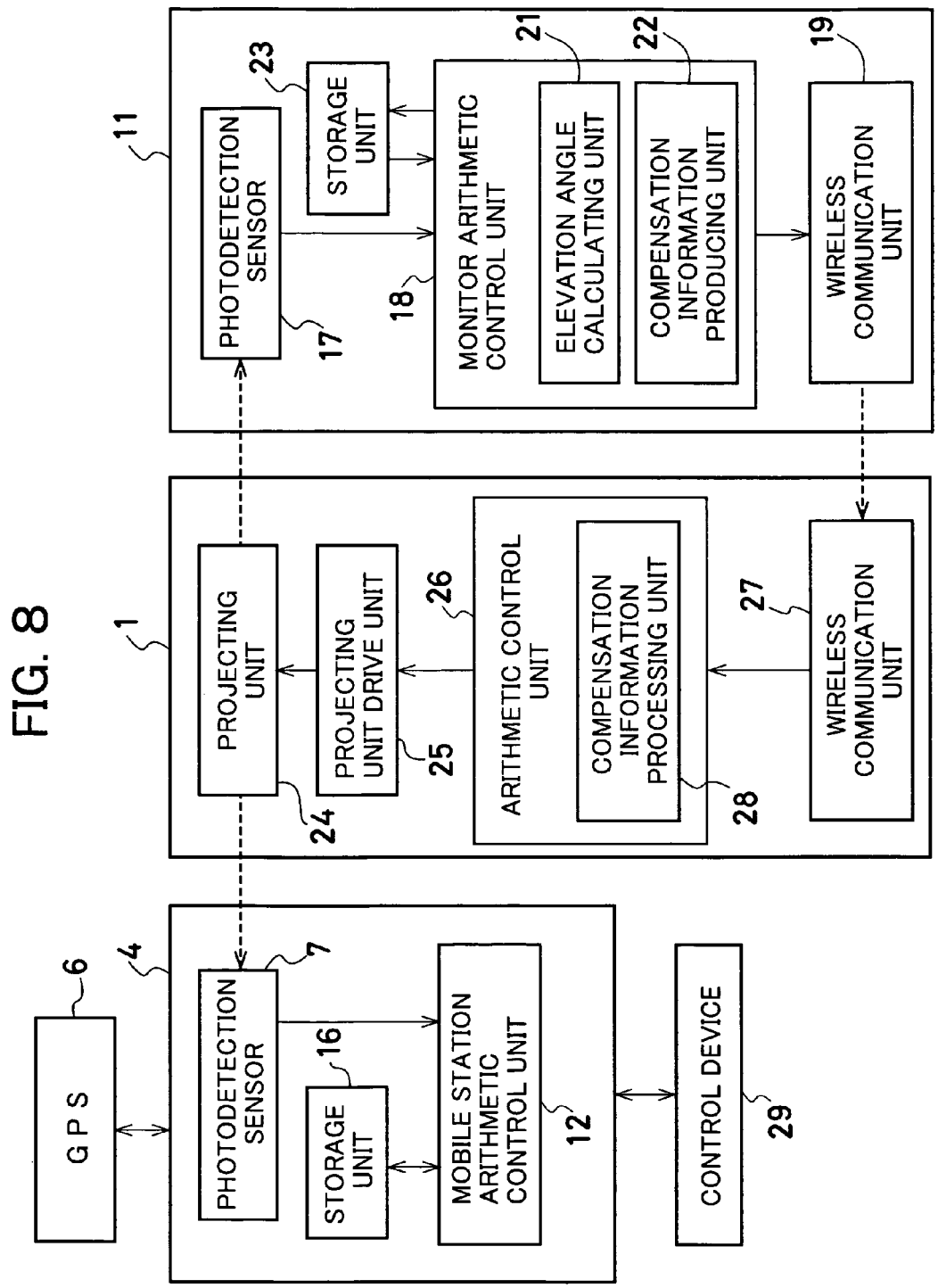
FIG. 8 is a block diagram to show a second embodiment of the present invention.

FIG. 8 shows a second embodiment of the present invention. Basic system configuration of the second embodiment is the same as the one shown in FIG. 5, and there are provided a rotary laser irradiation device 1, a photodetection device 4, and a monitor photodetection device 11.

In the second embodiment, compensation information acquired at the monitor photodetection device 11 is transmitted to the rotary laser irradiation device 1, and the rotary laser irradiation device 1 compensates a projecting direction of the laser beam 3, which is projected in rotary irradiation.

More concrete description will be given below.

The rotary laser irradiation device 1 comprises a projecting unit 24, a projecting unit drive unit 25, an arithmetic control unit 26, and a wireless communication unit 27. The projecting unit 24 projects the fan-shaped beams in rotary irradiation. The projecting unit drive unit 25 drives the projecting unit 24, and the projecting unit drive unit 25 makes the projecting unit 24 to emit the fan-shaped beams, to rotate the fan-shaped beams and to change the elevation angle of the fan-shaped beams. The arithmetic control unit 26 has a compensation information processing unit 28 and controls the projecting unit drive unit 25 based on the compensation information acquired from the compensation information processing unit 28. The wireless communication unit 27 performs communication of the compensation information with the monitor wireless communication unit 19 of the monitor photodetection device 11.

The monitor photodetection device 11 is the same as the one described in the first embodiment, and detailed description is not given here.

The photodetection device 4 has a photodetection sensor 7 and a mobile station arithmetic control unit 12. The mobile station arithmetic control unit 12 calculates an elevation angle γ and a height position of the photodetection sensor 7 based on a signal from the monitor storage unit 23.

In the second embodiment, the compensation information acquired at the monitor photodetection device 11 is transmitted to the rotary laser irradiation device 1. The rotary laser irradiation device 1 adjusts a projecting direction (i.e. the elevation angle γ) via the projecting unit drive unit 25 based on the compensation information and maintains the laser reference plane RP in the horizontal direction.

Therefore, the laser reference plane RP received at the photodetection device 4 is constantly maintained in the horizontal direction, and errors over time are removed from the elevation angle and the height position obtained by the mobile station arithmetic control unit 12.

The working machine 9 can carry out the ground leveling operation with high accuracy according to the laser reference plane RP.

Figure 9:
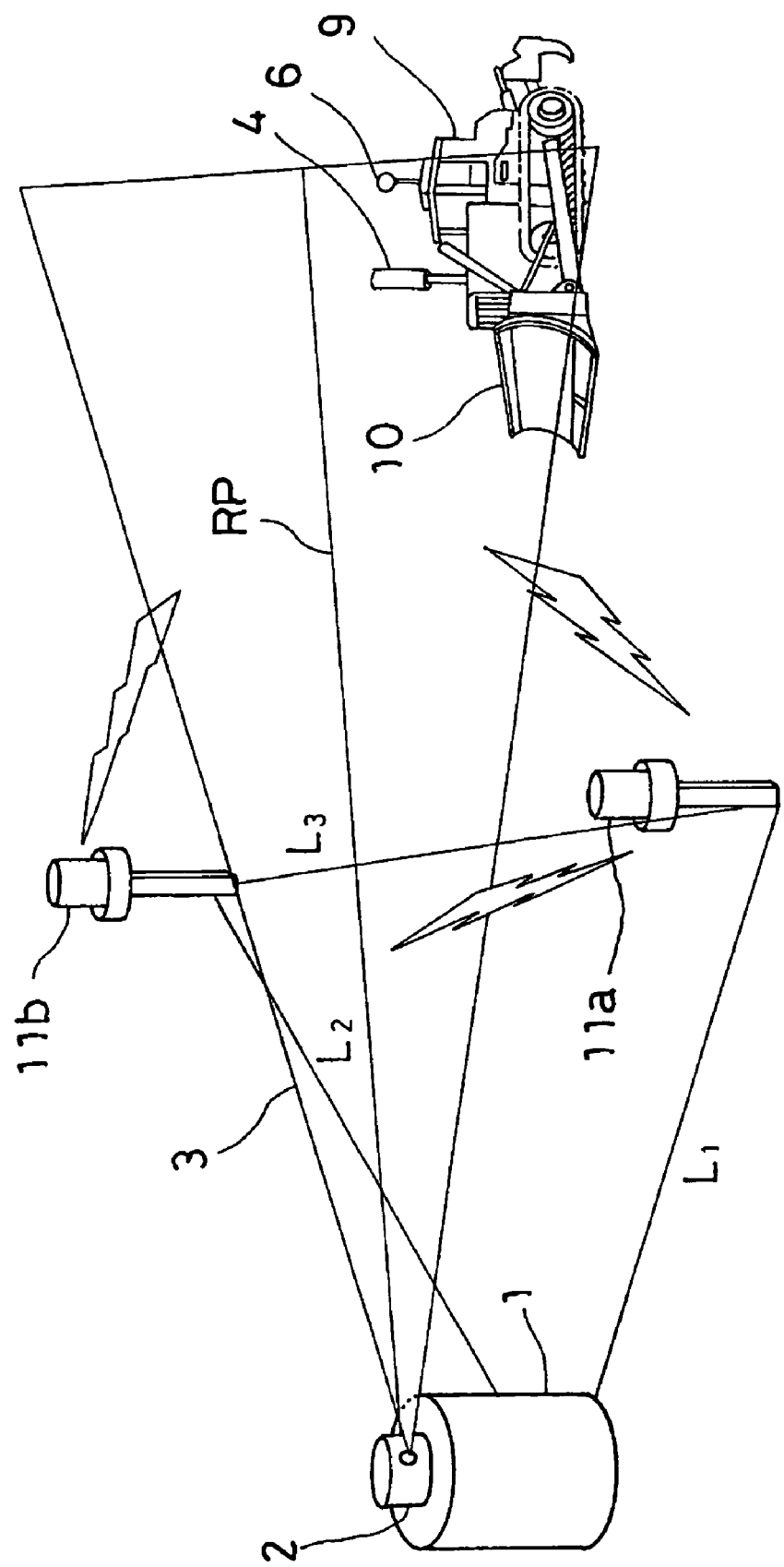
FIG. 9 is a schematical illustrative drawing to show a third embodiment of the present invention.

Referring to FIG. 9, description will be given on a third embodiment of the present invention.

The third embodiment shows a case where two sets of the monitor photodetection devices 11 are installed.

A rotary laser irradiation device 1 is installed at a known point. Monitor photodetection devices 11a and 11b are installed at known positions, and the monitor photodetection devices 11a and 11b are installed in a known relation with the rotary laser irradiation device 1. A monitor photodetection device 11a and a monitor photodetection device 11b are installed in a known relation with each other.

The rotary laser irradiation device 1, the photodetection device 4 and the monitor photodetection devices 11a and 11b are the same as the rotary laser irradiation device 1, the photodetection device 4 and the monitor photodetection device 11 in the first embodiment, and detailed description is not given here.

In the third embodiment, the laser beams 3 are received by the monitor photodetection devices 11a and 11b, and compensation information is produced, and the compensation information is transmitted to the photodetection device 4. At the photodetection device 4, a position data of the rotary laser irradiation device 1 on the laser reference plane RP formed by the laser beam 3 and two compensation information are acquired from the monitor photodetection devices 11a and 11b. As a result, it is possible to make compensation on a flat plane.

For instance, it is supposed here that a distance between the rotary laser irradiation device 1 and the monitor photodetection device 11a is L1, that a distance between the rotary laser irradiation device 1 and the monitor photodetection device 11b is L2, and that a distance between the monitor photodetection devices 11a and 11b is L3.

When the changes over time occur on the rotary laser irradiation device 1 and a tilting component develops on the laser beam 3, which is projected in rotary irradiation, the monitor photodetection device 11a detects an elevation angle γ1 from the result of photodetection (a tilting of the reference plane at an installed position of the monitor photodetection device 11a caused by the changes over time). Then, a height displacement of h1 (=L1×tan γ1) with respect to the horizontal plane is caused due to the elevation angle γ1 and the distance L1.

Similarly, with respect to the monitor photodetection device 11b, an elevation angle γ2 (a tilting of the reference plane at an installed position of the monitor photodetection device 11b caused by the changes over time) is detected from the result of photodetection, and a height displacement of h2 (=L2×tan γ2) with respect to the horizontal plane is resulted due to the elevation angle γ2 and the distance L2.

If it is supposed here that h1≠h2, the height displacement in both h1 and h2 is: Δh=h1−h2. Therefore, the laser reference plane RP has a tilting of γ3 (=tan$^{-1}$ (Δh/L3)) between the monitor photodetection devices 11a and 11b.

That is, with the projected point of the laser beam 3 from the rotary laser irradiation device 1 as the center, the laser reference plane RP is tilted at an angle of γ1 in the direction of "the rotary laser irradiation device 1—the monitor photodetection device 11a" and the laser reference plane RP is tilted at angle of γ3 in the direction of "the monitor photodetection device 11a—the monitor photodetection device 11b".

Therefore, by measuring the coordinates of the photodetection device 4 by the GPS position measuring device 6, a position with respect to the rotary laser irradiation device 1 within the laser reference plane RP can be identified. Further, by receiving the laser beams 3, the photodetection device 4 detects an elevation angle γd with respect to the rotary laser irradiation device 1. Further, based on the detected elevation angle γd and the compensation information (γ1, γ3), accurate height with respect to the horizontal reference plane RP as initially set can be obtained. The compensation information may be (γ2, −γ3).

In the description as given above, the rotary laser irradiation device 1, the photodetection device 4 and the monitor photodetection device 11 are set in the equivalent arrangement as the first embodiment, while it may be so designed that the rotary laser irradiation device 1, the photodetection device 4 and the monitor photodetection device 11 are set in the equivalent arrangement as the second embodiment, and that the compensation information is produced at the rotary laser irradiation device 1 and the elevation angle of the projection of the laser beam 3 to be projected by the rotary laser irradiation device 1 is adjusted.

Even in case where the compensation is made based on the compensation information acquired in the first embodiment and the second embodiment, a slight error (compensation residual error), which cannot be compensated, may occur.

Figure 10:
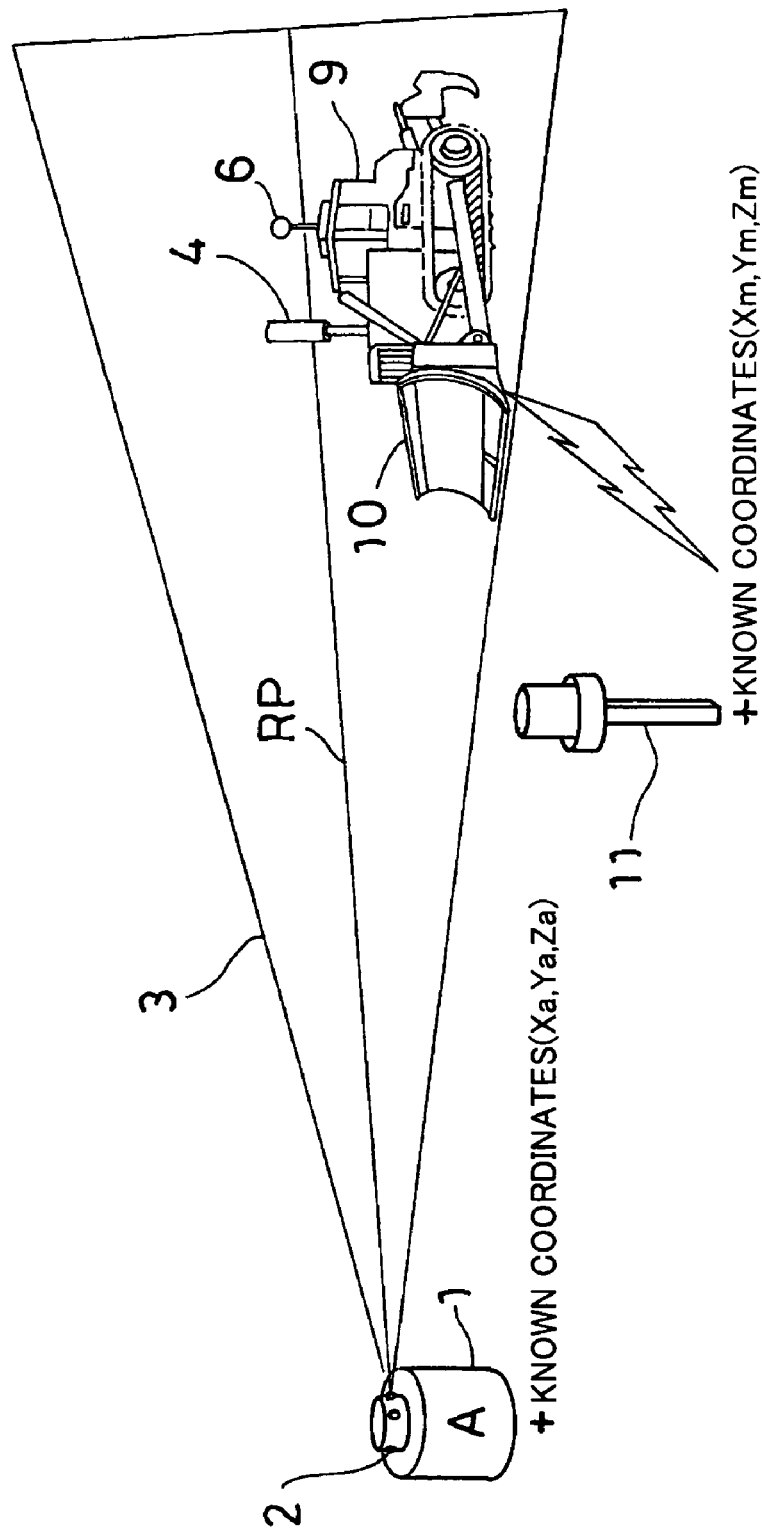
FIG. 10 is a schematical illustrative drawing to show a case where compensation residual error is compensated in the present invention.

Referring to FIG. 10, description will be given below on a case where the operation accuracy can be improved further by detecting the compensation residual error and by adding the compensation residual error to the compensation information.

As described above, the installed position of the rotary laser irradiation device 1 and the installed position of the monitor photodetection device 11 are already known, i.e. three-dimensional coordinates (Xa, Ya, Za) and (Xm, Ym, Zm) of these installed position are already known. Thus, the compensation residual error can be obtained according to the known relation between the rotary laser irradiation device 1 and the monitor photodetection device 11.

Leveling is performed on the rotary laser irradiation device 1 so that the laser beam 3 is projected in horizontal direction. In this case, the laser reference plane formed by the laser beam 3 is in the reference state, and the laser reference plane is a horizontal reference plane RP. The height of the horizontal reference plane RP is already known (Za) from the coordinates as given above (Xa, Ya, Za).

The height of the monitor photodetection device 11 is already known (Zm) from the coordinates (Xm, Ym, Zm) as given above. Therefore, an expected photodetecting position (Zp) of the height of the laser beam 3 received by the monitor photodetection device 11 can be calculated from the values of (Za) and (Zm).

Accordingly, if an actual photodetecting position (Zp') is the same as the expected photodetecting position (Zp) obtained by calculation, there is no compensation residual error. If it is different, the difference (Zp−Zp') is an error that the rotary laser irradiation device 1 has in itself, and this error is the compensation residual error, which cannot be compensated by the above compensation information. The compensation residual error may be treated as a deviation in the height direction or the compensation residual error may be treated as a deviation of the elevation angle.

The monitor photodetection device 11 stores the compensation residual error in the monitor storage unit 23, and transmits the compensation residual error to the photodetection device 4 or the rotary laser irradiation device 1 together with the compensation information. Or, the monitor photodetection device 11 transmits a compensation information further compensated by the compensation residual error as the new compensation information.

By adding the compensation residual error to the compensation information, the operation accuracy of the working machine 9 is improved further.

As shown in FIG. 9, by providing two sets of the monitor photodetection devices 11a and 11b and by obtaining compensation residual error on each of the monitor photodetection devices 11a and 11b, compensation can be performed by giving due consideration on the compensation residual error on a plane.

Figure 11:
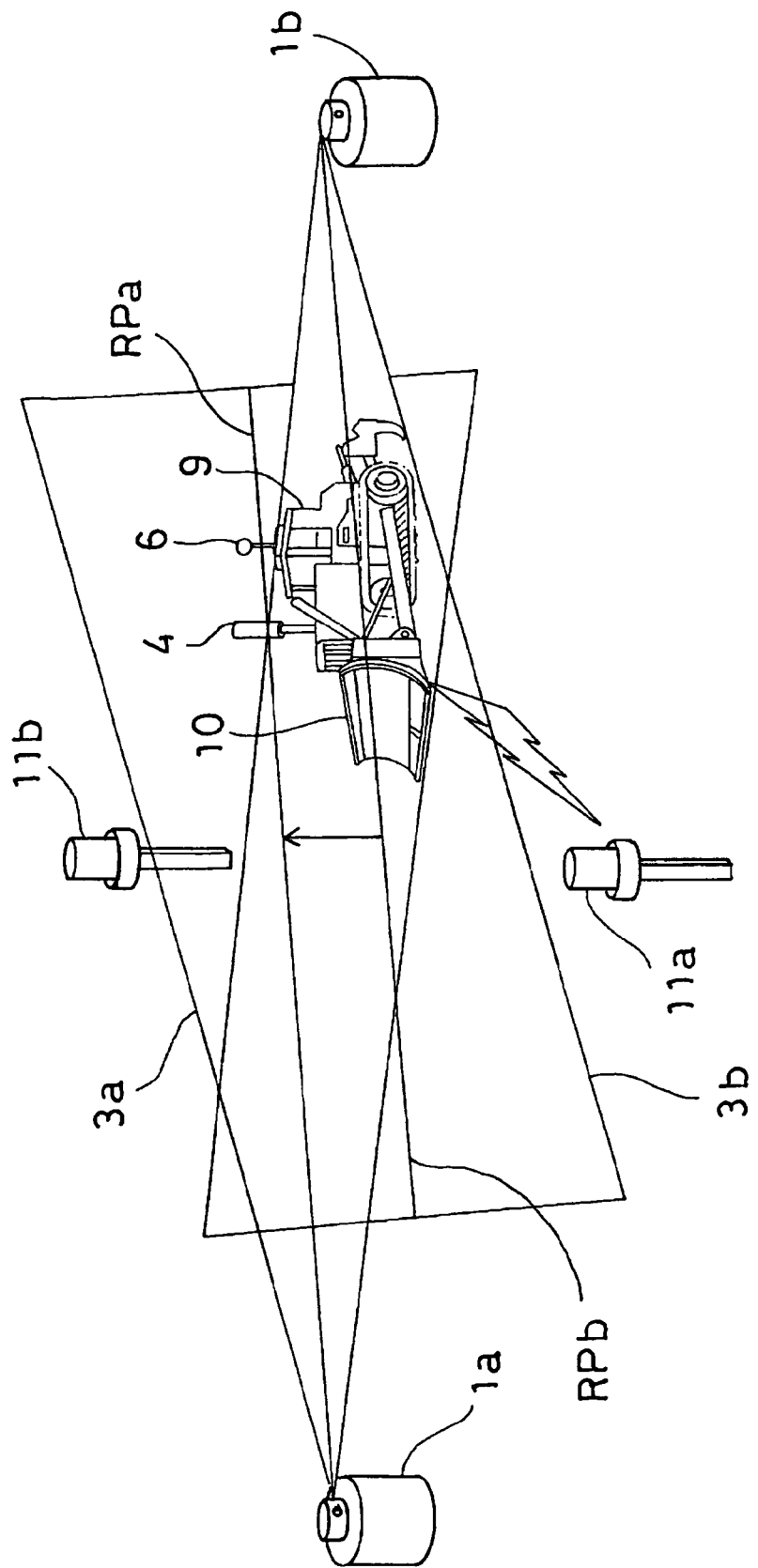
FIG. 11 is a schematical illustrative drawing to show a fourth embodiment of the present invention.
Figure 12:
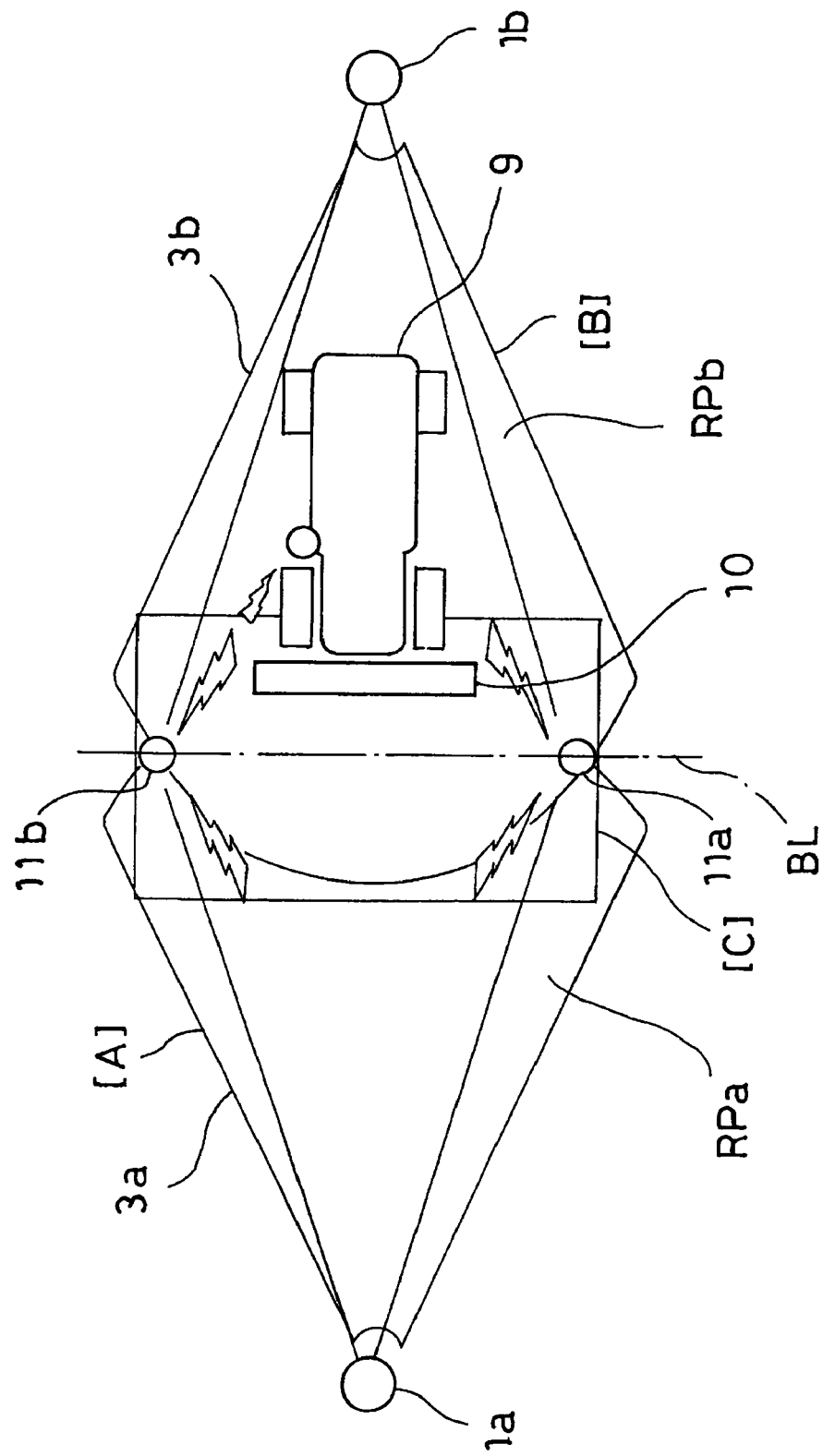
FIG. 12 is an illustrative drawing to show smoothing processing in the fourth embodiment of the present invention.

Referring to FIG. 11 to FIG. 13, description will be given below on a fourth embodiment of the present invention.

The fourth embodiment shows a case where a plurality of rotary laser irradiation devices, e.g. two sets of rotary laser irradiation devices 1a and 1b are installed, and also, where a plurality of the monitor photodetection devices 11, e.g. two sets of monitor photodetection devices 11a and 11b are installed.

The rotary laser irradiation device 1a projects a laser beam 3a in rotary irradiation and forms a laser reference plane RPa, and the rotary laser irradiation device 1b projects a laser beam 3b in rotary irradiation and forms a laser reference plane RPb.

The photodetection device 4 to be mounted on the working machine 9 is provided with two sets of photodetection sensors 7a and 7b (see FIG. 1) so that the laser beams 3a and 3b from the rotary laser irradiation devices 1a and 1b can be received respectively. The laser beam 3a and the laser beam 3b are projected in different modulations so that the photodetection sensors 7a and 7b may not erroneously detect the laser beams 3a and 3b.

The two sets of the monitor photodetection devices 11a and 11b have the function to discriminate the modulation of the laser beams 3a and 3b and to identify the laser beam 3a and the laser beam 3b respectively. As a method of identification, photodetection signals from the photodetection sensors 7a and 7b are divided by time division. The modulation of the laser beams 3a and 3b is detected, and the laser beams 3a and the laser beam 3b are discriminated from each other. Further, when the compensation information is produced, a symbol to discriminate as to which of the rotary laser irradiation devices 1a and 1b the laser reference plane is formed by is added to the compensation information.

From the symbol of the compensation information received, the photodetection device 4 discriminates whether the compensation information is based on the laser reference plane RPa or the compensation information is based on the laser reference plane RPb, and the compensation can be made to correspond to the detected laser reference plane RPa or to the laser reference RPb.

Figure 6:
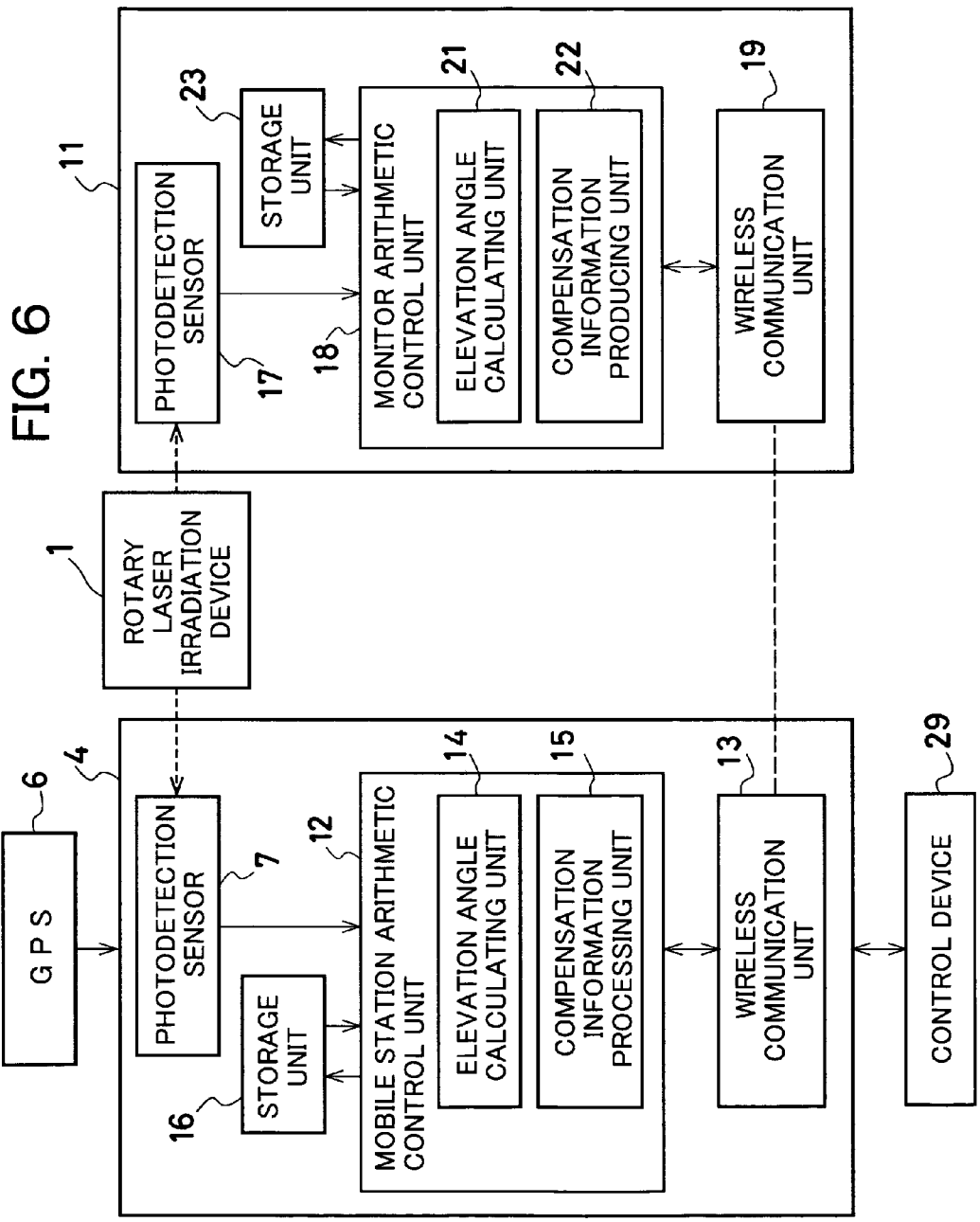
FIG. 6 is a block diagram to show the first embodiment of the present invention.

The main arrangement is the same as described in FIG. 6 except that the photodetection device 4 has two sets of photodetection sensors 7a and 7b. Thus, description will be given below by referring to FIG. 6.

In the mobile station arithmetic control unit 12 of the photodetection device 4, the following regions and line are set in advance: a region [A] using the laser reference plane RPa formed by the rotary laser irradiation device 1a, a region [B] using the laser reference plane RPb formed by the rotary laser irradiation device 1b, a boundary line BL between the region [A] and the region [B] and a smoothing region [C] which is a predetermined range including the boundary line BL. The setting information of the region [A], the region [B], the region [C] and the boundary line BL are stored in the monitor storage unit 23 of the monitor photodetection device 11, for instance. For the setting of the boundary line BL, it is preferable that the boundary line BL is set to a line connecting the monitor photodetection device 11a with the monitor photodetection device 11b. More simply, it may be so arranged that one monitor photodetection device 11 is provided in a region where the laser reference plane RPa and the laser reference plane RPb are overlapped each other and that the laser reference planes RPa and RPb is received respectively so that the changes over time of the elevation angles of the laser reference planes RPa and RPb are detected. Here, it is needless to say that the monitor photodetection device 11 has two sets of photodetection sensors 7a and 7b, which can discriminate and detect the laser beams 3a and 3b from each other.

Based on the coordinate position as measured by the GPS position measuring device 6, the mobile station arithmetic control unit 12 or the control device 29 judges to which of the regions the photodetection device 4 (i.e. working position of the working machine 9) belongs, or at which point in the region the photodetection device 4 is positioned.

Each of the monitor photodetection devices 11a and 11b has two sets of the photodetection sensors 7 respectively, and the laser beam 3a and the laser beam 3b are received individually without causing detection error.

Therefore, the relation between the rotary laser irradiation device 1a and the monitor photodetection devices 11a and 11b is the same to the relation of the rotary laser irradiation device 1 with the monitor photodetection devices 11a and 11b as shown in FIG. 9. Based on the results of detection of the monitor photodetection devices 11a and 11b, two or more compensation information with respect to the laser reference plane RPa formed by the rotary laser irradiation device 1a are produced, and these compensation information are transmitted to the photodetection device 4.

Therefore, the photodetection device 4 can compensate errors over time on the laser reference plane RPa formed by the laser beam 3a based on the compensation information.

Also, the relation of the rotary laser irradiation device 1b with the monitor photodetection devices 11a or 11b is the same as the relation of the rotary laser irradiation device 1 with the monitor photodetection devices 11a or 11b as shown in FIG. 9. The monitor photodetection devices 11a and 11b produce two or more compensation information on the laser reference plane RPb formed by the laser beam 3b, and the photodetection device 4 can compensate the errors over time on the laser reference plane RPb formed by the laser beam 3b.

When there is no error at all on the laser reference planes RPa and RPb formed by the laser beam 3a and the laser beam 3b respectively, heights of the two laser reference planes are equal to each other, and there is no tilting. Therefore, the reference planes RPa and RPb are the reference plane RP as shown by the broken line in FIG. 13(A).

However, even when compensation is made by compensation information, it is very rare that the laser reference planes formed by the laser beam 3a and the laser beam 3b are completely consistent with each other. In most cases, a graded step 31 may occur at the boundary line BL due to the compensation residual error.

Therefore, if the ground leveling operation is carried out according to the laser reference plane formed by the laser beam 3b and the laser beam 3a, the graded step 31 may occur on the leveled ground surface. In the ground leveling operation, it is not desirable that the graded step 31 occurs. In the fourth embodiment, the smoothing processing as described below is carried out to eliminate the graded step 31.

Figure 13A:
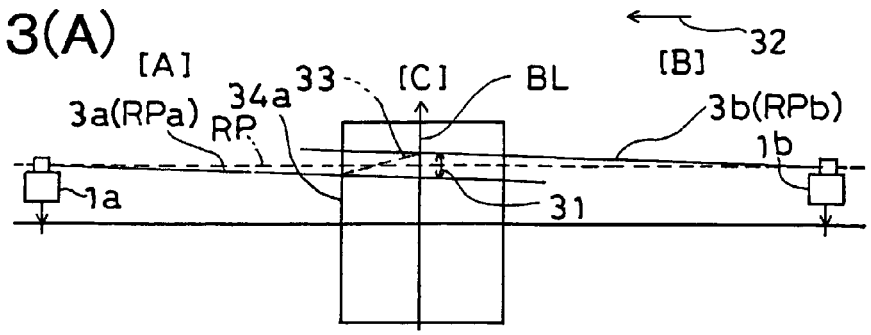
FIG. 13(A), FIG. 13(B), FIG. 13(C) and FIG. 13(D) each represents an illustrative drawing to show the smoothing processing in the fourth embodiment of the present invention.

It is supposed here that the working machine 9 advances in a direction shown by an arrow 32 in FIG. 13(A). FIG. 13(A) shows a case where the laser beam 3a is tilted downward, and the laser beam 3b is tilted upward.

As described above, a predetermined range including the boundary line BL is set as a smoothing region [C]. In the range of the smoothing region [C], a smoothing plane 33 where the graded step 31 is eliminated is obtained by calculation as given below.

When the monitor photodetection devices 11a and 11b positioned on the boundary line BL receives the laser beam 3a and the laser beam 3b, a difference between photodetecting positions of the two laser beams 3a and 3b can be detected. The difference of the photodetecting positions of the two laser beams 3a and 3b is nothing but the graded step 31 between the two laser reference planes RPa and RPb on the boundary line BL. The position of a boundary line 34a at a point closer to the rotary laser irradiation device 1a in the smoothing region [C] is obtained from the setting information of the smoothing region [C]. Further, a height of the laser reference plane RPa at the boundary position 34a can be calculated based on the result of photodetection of the laser beam 3a by the monitor photodetection devices 11a and 11b, based on an elevation angle of the laser beam 3a obtained from the result of photodetection, and also, based on positional relation between the rotary laser irradiation device 1a and the monitor photodetection devices 11a and 11b.

As a result, it is possible to calculate the smoothing plane 33 of downward tilting from the position of the laser beam 3b running across the boundary line BL to the position of the laser beam 3a, which runs across the boundary 34a of the smoothing region [C] which is closer to the rotary laser irradiation device 1a.

By transmitting the data on the smoothing plane 33 to the photodetection device 4 by the monitor wireless communication unit 19, the working machine 9 continues to carry out the ground leveling operation based on the photodetection result of the laser beam 3b until the photodetection device 4 reaches the region [B] and the boundary line BL.

In the range from the boundary line BL to the boundary 34a, the position of the photodetection device 4 in the range from the boundary line BL to the boundary 34a can be calculated based on the result of the measurement of coordinates by the GPS position measuring device 6. Then, a deviation between the reference plane formed by the laser beam 3a and the smoothing plane 33 at the calculated position can be obtained.

The photodetection device 4 adds the deviation to the result of detection and outputs it. Then, the equivalent result as the detection of the smoothing plane 33 by the photodetection device 4 can be obtained. It may be so arranged that the height at the coordinate position on the smoothing plane 33 is obtained from the smoothing plane 33 and from the coordinate position of the GPS position measuring device 6.

Specifically, in the range from the boundary line BL to the boundary 34a, the ground leveling operation is carried out according to the smoothing plane 33. When it goes beyond the smoothing region [C] and enters the region [A], the ground leveling operation is performed based on the result of photodetection of the laser beam 3a by the photodetection device 4.

By setting up the smoothing plane 33 within the smoothing region [C], the graded step 31 between the laser beams 3a and 3b can be eliminated.

Figure 13B:
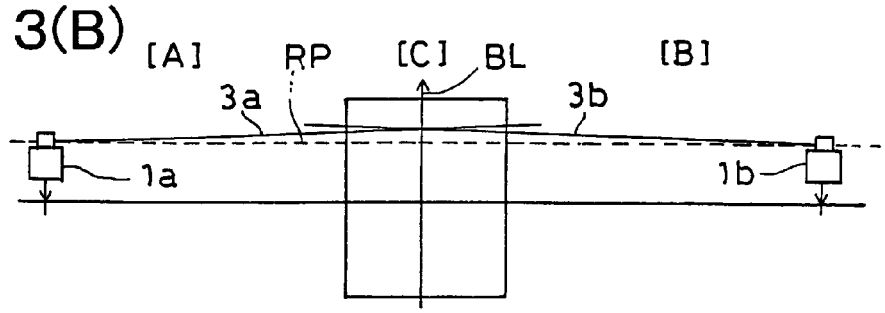

FIG. 13(B) shows a case where both the laser beams 3a and 3b are tilted upward, and further, the laser beams become consistent with each other on the boundary BL.

Under such condition, there are compensation residual errors in both of the laser beams 3a and 3b, but no graded step 31 occurs, and there is no need to perform the smoothing processing.

Figure 13C:
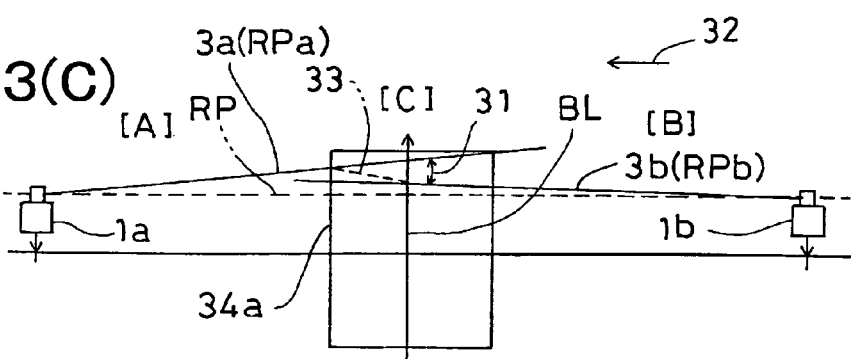

FIG. 13(C) shows a case where the laser beams 3a and 3b are tilted upward and a graded step 31 occurs on the boundary line BL.

In this case, too, similarly to the case shown in FIG. 13(A), it is possible to calculate the smoothing plane 33 from the position of the laser beam 3b running across the boundary line BL to the position of the laser beam 3a, which runs across the boundary 34a at a point closer to the rotary laser irradiation device 1a in the smoothing region [C]. In this case, the smoothing plane 33 is tilted upward.

When the monitor photodetection device 11 receives the laser beams 3a and 3b, the monitor photodetection device 11 detects inconsistency between the laser reference plane RPa and the laser reference plane RPb on the boundary line BL and the graded step 31 caused by the inconsistency. Because it is possible to set the smoothing plane 33, which can eliminate the graded step 31, the reference planes in wider range can be formed by a plurality of rotary laser irradiation devices 1.

Figure 13D:
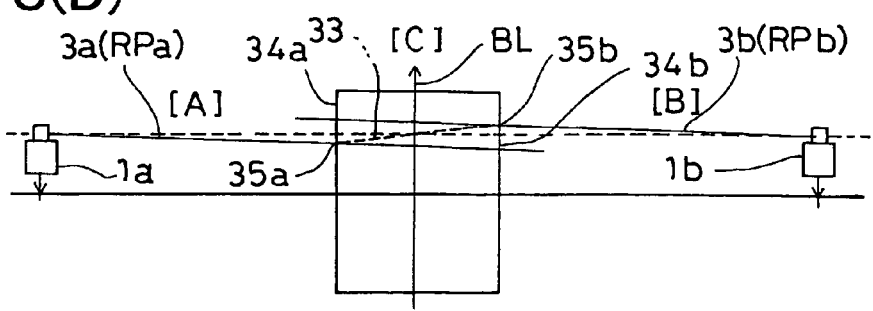

FIG. 13(D) shows another example of the smoothing processing.

It is supposed here that the boundary closer to the rotary laser irradiation device 1a in the smoothing region [C] is 34a, and that the boundary closer to the rotary laser irradiation device 1b is 34b. When the laser beam 3a is detected by the monitor photodetection devices 11a and 11b, it is possible to calculate a height position of a crossover line 35a where the laser reference plane RPa formed by the laser beam 3a and the smoothing region [C] cross each other. Similarly, when the laser beam 3b is detected by the monitor photodetection devices 11a and 11b, it is possible to calculate a height position of a crossover line 35b where the laser reference plane RPb formed by the laser beam 3b and the smoothing region [C] cross each other.

Therefore, a plane connecting the crossover line 35a with the crossover line 35b is calculated and this plane may be regarded as a smoothing plane 33. In this case, at the moment when it is judged that the photodetection device 4 has entered the smoothing region [C] based on the result of measurement of coordinate position of the GPS position measuring device 6, control operation is performed by regarding the smoothing plane 33 as a reference plane.

In the fourth embodiment as given above, description is given on a case where the photodetection device 4 has two sets of photodetection sensors 7a and 7b, while there may be only one set of the photodetection sensor 7.

In case only one set of the photodetection sensor 7 is used, it is so arranged that the mobile station arithmetic control unit 12 of the photodetection device 4 detects modulations of the laser beams 3a and 3b from the photodetection signals of the photodetection sensor 7, that the laser beams 3a and 3b can be discriminated from each other, and further, that the signal of the photodetection sensor 7 is divided by time division, and each of the laser beams 3a and 3b is detected alternately. In this case, it is preferable that the photodetection sensor 7 is designed as a photodetection unit, which can receive and detect the laser beam from total circumferential direction.

Based on the result of position measurement by the GPS position measuring device 6 and also based on the calculated position information, it can be identified at which point the photodetection sensor 7 is positioned in the region [A], the region [B], and the region [C]. It may be so arranged that, when the photodetection sensor 7 is in the region [A], the laser beam 3a is detected or the laser beam 3a is detected preferentially, and in case the photodetection sensor 7 is in the region [B], the laser beam 3b is detected or the laser beam 3b is detected preferentially. Further, if the photodetection sensor 7 is in the region [C], the laser beam 3a or the laser beam 3b is alternately detected by time division.

The invention claimed is:

1. A surveying system, comprising a rotary laser irradiation device installed at a known point and used for projecting two or more fan-shaped laser beams with at least one of said fan-shaped laser beams tilted and for forming a laser reference plane, a photodetection device, which is mounted on a mobile support member, for receiving said laser beam and for calculating an elevation angle at a photodetecting position, and a monitor photodetection device installed at a known position within said laser reference plane, wherein said monitor photodetection device has a monitor photodetection sensor for sensing and detecting said laser beam, a storage unit for storing a reference value of said laser reference plane, an arithmetic control unit for calculating positional changes over time of said laser reference plane based on the result of photodetection by said monitor photodetection sensor and on said reference value, and a transmitting unit for transmitting said positional changes over time to said photodetection device and/or to said rotary laser irradiation device as compensation information.

2. A surveying system according to claim 1, wherein a compensation residual error is obtained based on an installed position of the rotary laser irradiation device, based on an installed position of said monitor photodetection device, based on an expected photodetecting position of said monitor photodetection device when the laser reference plane is set to a reference state and based on a photodetecting position when the laser beam is actually received and said compensation information is produced based on said compensation residual error and said positional changes over time.

3. A surveying system according to claim 1, wherein a plurality of said monitor photodetection devices are provided at known points, said positional changes over time of said laser reference plane are calculated by each of said monitor photodetection devices, and said compensation information is produced based on a plurality of positional changes over time.

4. A surveying system according to claim 1 or 2, wherein said compensation information is an information of change of said elevation angle, and the elevation angle obtained by said photodetection device is compensated based on said compensation information.

5. A surveying system according to claim 1, wherein a plurality of said rotary laser irradiation devices are provided at known points, and at least one monitor photodetection device is provided at a known point in a region where the laser reference planes formed by each of rotary laser irradiation devices are overlapped each other.

6. A surveying system according to claims 1, wherein a plurality of said rotary laser irradiation devices are provided at known points, two monitor photodetection devices are provided at known points in a region where the laser reference planes formed by each of the rotary laser irradiation devices are overlapped each other, a line connecting said two monitor photodetection devices is regarded as a boundary of the two laser reference planes, a predetermined range including said boundary is set up as a smoothing region, and wherein in case there is a deviation in the detecting positions when said two monitor photodetection devices detect two laser reference planes, a smoothing plane connecting said two laser reference planes within said smoothing region is calculated based on a position detected by one of said monitor photodetection devices, and data of said smoothing plane is transmitted to said photodetection device and/or to said rotary laser irradiation device as compensation information.

7. A surveying system according to claim 6, wherein said smoothing plane obtained, when it is shifted from one of said laser reference planes to the other of said laser reference planes, strides over from a position where one of said laser reference planes goes across said boundary to a position where the other of said laser reference planes goes across said boundary of said smoothing region.

8. A surveying system according to claim 6, wherein said smoothing plane obtained, when it is shifted from one of said laser reference planes to the other of said laser reference planes, strides over from a position where one of said laser reference planes goes across one of boundaries of said smoothing region to a position where the other of said laser reference planes goes across the other boundary of said smoothing region.

9. A surveying system according to one of claims 1 or 6 to 8, wherein a GPS position measuring device is provided on said photodetection device or on said support member, and coordinate position of said photodetection device is measured.

10. A surveying system according to one of claims 6 to 8, wherein a photodetecting position of said photodetection device is compensated based on a deviation in height direction of said smoothing plane and said laser reference plane within said smoothing region.

11. A surveying system according to claim 6, wherein said rotary laser irradiation devices project laser beams with different modulations, respectively, and wherein said photodetection device and said monitor photodetection device are designed to discriminate the received laser beams.

12. A surveying system according to claim 11, wherein said monitor photodetection device adds a symbol for discriminating the laser beams to the compensation information to be transmitted, and wherein said photodetection device can discriminate as to which of the rotary laser irradiation devices the compensation information is related based on said symbol.

* * * * *